J. H. BANINGER.
BALL BEARING JOURNAL BOX FOR RAILWAY CARS AND THE LIKE.
APPLICATION FILED DEC. 29, 1917.
1,314,496.
Patented Sept. 2, 1919.
2 SHEETS—SHEET 1.
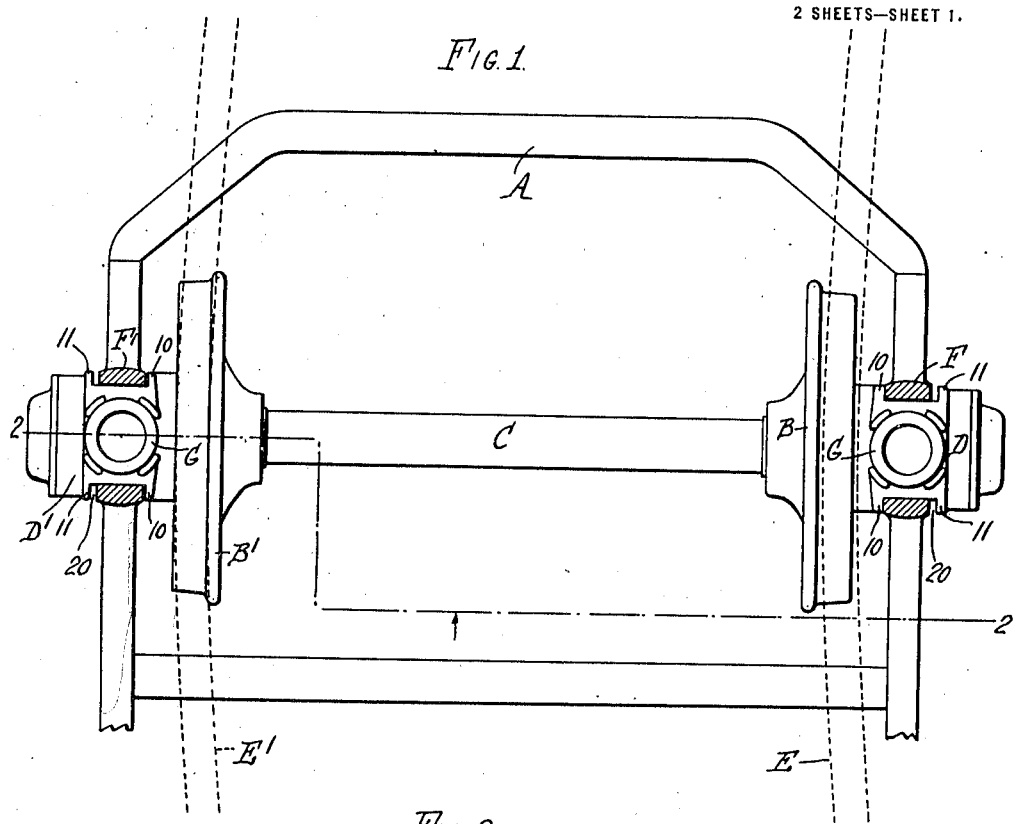
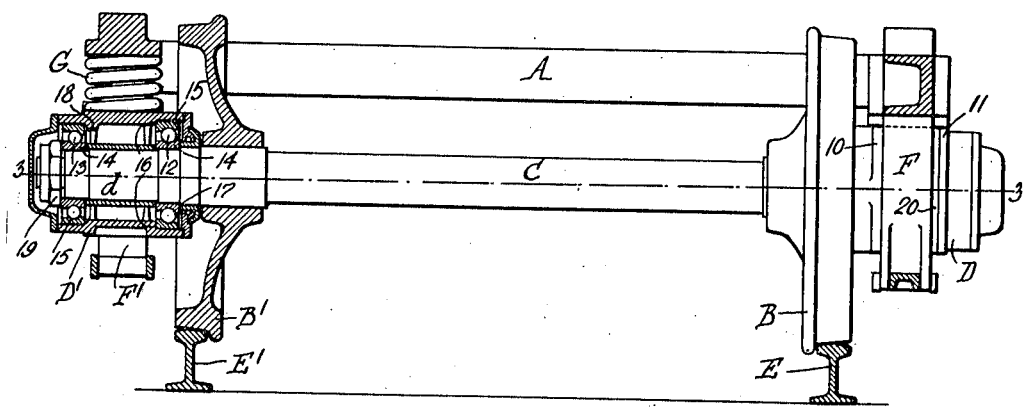
Inventor
John H. Baninger,
By
Wilhelm & Parker,
Attorney

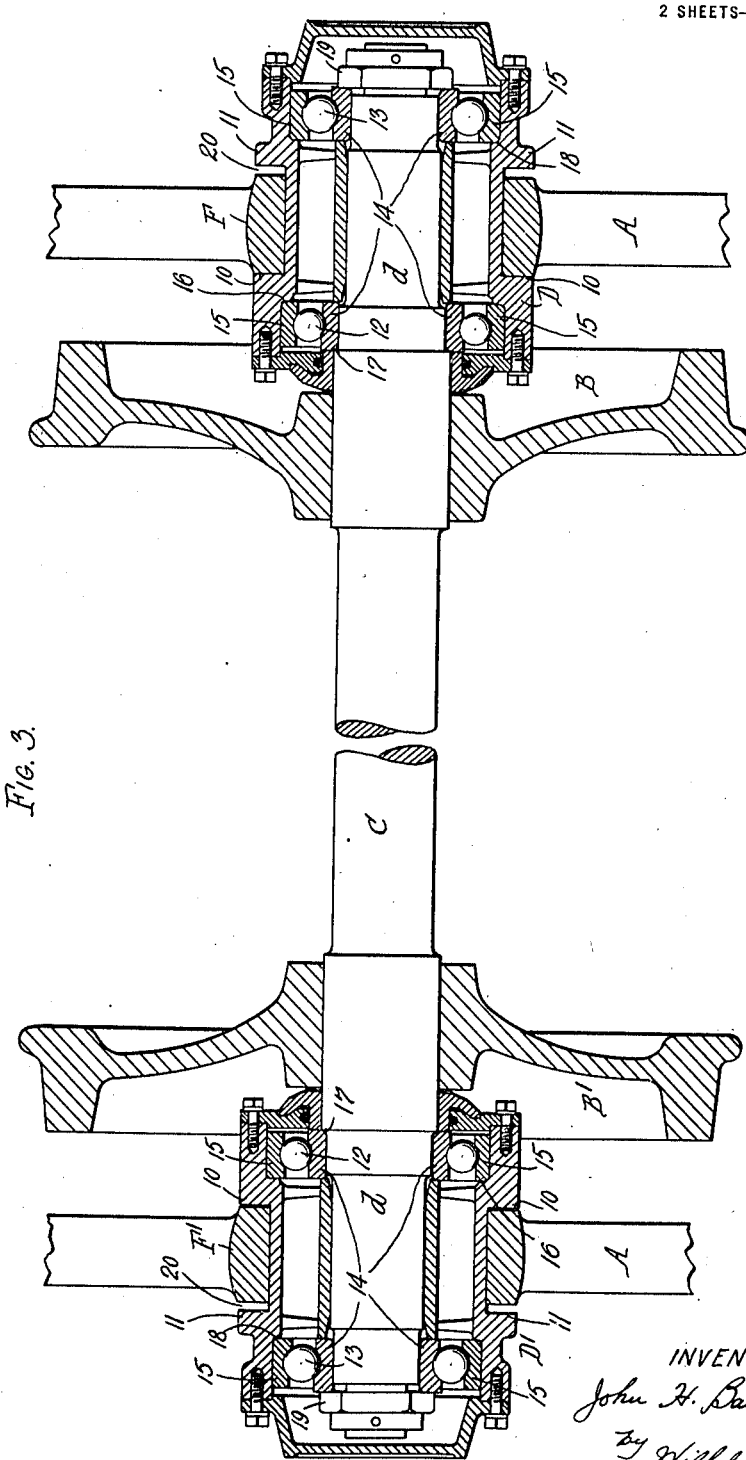

UNITED STATES PATENT OFFICE.

JOHN H. BANINGER, OF JAMESTOWN, NEW YORK, ASSIGNOR TO GURNEY BALL BEARING COMPANY, OF JAMESTOWN, NEW YORK.

BALL-BEARING JOURNAL-BOX FOR RAILWAY-CARS AND THE LIKE.

1,314,496.   Specification of Letters Patent.   Patented Sept. 2, 1919.

Application filed December 29, 1917. Serial No. 209,448.

*To all whom it may concern:*

Be it known that I, JOHN H. BANINGER, a citizen of Switzerland, residing at Jamestown, in the county of Chautauqua and State of New York, United States of America, have invented a new and useful Improvement in Ball-Bearing Journal-Boxes for Railway-Cars and the like, of which the following is a specification.

This invention relates to the construction and arrangement of ball bearing journal boxes for railway cars or other vehicles in which the wheels at the opposite sides of the vehicles are arranged in fixed relation to each other, as when the opposite wheels of the vehicle are secured in fixed position on a live axle. When a car is rounding a curve, centrifugal force, or the tendency of the car to continue in a straight course, changes the lines of direction of the forces exerted by the load so that there is thrust load as well as radial load on the bearings. The thrust load is exerted, obviously, toward the outer rail. There are two changes from the normal load resulting from this; one is that the bearings have to resist thrust load as well as radial load, and the other is that more weight or radial load is thrown upon the outer bearing than on the inner. This is forcibly shown by the fact that if the speed around a curve be too great the weight is shifted beyond the outer bearing and the car turns over. Just before the car tips over all the weight is on the outer bearings.

In other installations of ball bearings on cars the thrust load is taken usually on the outer bearings or on a hit-or-miss basis on either side, the load thus being usually added to the already excessive radial load on the outer bearings. The object of this invention is the provision of means whereby the thrust load is always taken on the bearings at the inner side of the curve, these bearings being always relieved of a portion of their regular radial load by this same centrifugal action that throws the larger part of the weight over on the outer bearings. In this way the bothersome thrust load is always put where there is extra capacity made available for it by centrifugal action.

In the accompanying drawings:—

Figure 1 is a fragmentary plan view, partly in section, of a car truck or the like embodying the invention, showing the position of the parts when the truck is traveling on a curved track.

Fig. 2 is an end elevation thereof, partly in section on line 2—2, Fig. 1.

Fig. 3 is an enlarged sectional plan view thereof on line 3—3, Fig. 2.

A represents a portion of a car truck frame of any usual or suitable construction, B B' a pair of truck wheels therefor, C an axle for said pair of wheels and D D' journal boxes in which the journals $d$ at the opposite ends of said axle are mounted to turn in ball bearings. In Fig. 1 the truck is illustrated as traveling on a curved track, the inner and outer rails of which are shown respectively at E E'. As usual, the journal boxes are mounted to slide or move vertically in pedestals or guides F F' on the opposite sides of the truck frame, and the frame is yieldingly supported from the journal boxes, as by means of suitable springs G. In the construction shown, each journal box is provided at each of its opposite sides with inner and outer parallel spaced projections, shoulders or the like, 10 and 11, between which the upright sides or columns of the pedestals or guides extend to retain the frame in place on the journal boxes. It is usual in car trucks to provide such guide projections on the journal boxes between which the pedestal columns are confined, but in the present construction the projections or shoulders 10 and 11 are spaced apart a distance greater than the width of the interposed portion of the pedestal, sufficient to allow a clearance between the outer projections 11 and the pedestal columns. The purpose of this construction will be hereinafter explained.

Each axle journal revolves in ball bearings 12 and 13 arranged in the journal box respectively at the inner and outer portions of the journal $d$. These ball bearings may be of any suitable construction. As shown, each bearing consists of an inner grooved bearing ring 14, an outer grooved bearing ring 15 and bearing balls interposed between the rings 14 and 15. The outer ring of the ball bearing 12 for the inner end of the journal is seated in the journal box against an inwardly facing shoulder or stop 16 in the journal box, while the inner ring of this bearing is seated on the journal against an outwardly facing shoulder or stop 17. The outer ring of the ball bearing 13 for the outer end of the journal is seated in the journal box against an outwardly facing shoulder or stop 18 while the inner ring of this bearing is seated on the outer end of the journal against an inwardly facing stop member 19. The journal is thus held from endwise play in the bearings and outward thrust on the journal is transmitted to the inwardly facing shoulder or stop 16 of the journal box while inward thrust on the journal is transmitted to the outwardy facing shoulder or stop 18 of the journal box.

When the car or vehicle is rounding a curve, centrifugal force tends to shift the moving parts toward the outer side of the curved track and causes the flange of the wheel B' traveling on the outer rail to bear against such rail. The engagement of the wheel flange with the rail limits the extent to which the wheels and axle can move outwardly. If the journal boxes were connected to the truck frame so as to be caused to shift outwardly with the truck frame, under the centrifugal force, end thrust would be thrown on the outer ball bearing 13 for the journal at the outer side of the vehicle, or side nearest the outer rail of the curved track. In order to prevent this, a clearance or space 20 is left, as above mentioned, between the outer guide projections 11 of the journal boxes and the columns of the pedestals or journal box guides. As shown in Figs. 1 and 3, there is a clearance left between the outer side of the pedestal F' and the outer guide projections 11 of the journal box D' at the outer side of the vehicle or side thereof nearest to the outer curved rail, whereas the pedestal F at the opposite or inner side of the truck frame bears against the inner guide projections 10 of the journal box D in this pedestal. Therefore, since the wheels and axle are held from outward movement by engagement of the flange of the wheel B' with the outer track rail E', and the outward lateral movement of the truck frame is resisted by the engagement of the pedestal F with the projections 10 of the journal box at the inner side of the truck or vehicle, no end thrust is thrown upon the bearings for the journal at the outer side of the truck or vehicle. On the contrary, the end thrust is taken by the journal box at the inner side of the truck or vehicle and is transmitted to the journal in this box by the ball bearing for the inner end of this journal. Thus the ball bearings of the journal boxes at the outer side of the truck or vehicle are relieved from all end thrust when the vehicle is rounding a curve.

Since the pedestals F F' contact with the inner journal-box shoulders 10, 10, and there are clearances between the pedestals and the outer journal-box shoulders 11, 11, the latter shoulders are not essential to the described action of the invention and could be omitted. They are, however, preferably left on the journal boxes for purposes of symmetry, rigidity of construction and strength.

I claim as my invention:

1. In a vehicle, the combination with wheels at opposite sides of the vehicle arranged in fixed relation to each other, journals for said wheels, a ball bearing journal box for each journal, a frame in which said journal boxes are mounted, and connections between said frame and each journal box consisting of coöperating contact portions on said frame and journal boxes, said portions being so arranged and related to each other that each journal box takes the lateral thrust of said frame in a direction toward the inner end of said journal box and is relieved of the lateral thrust of said frame in a direction toward the outer end of said journal box.

2. In a vehicle, the combination with wheels at opposite sides of the vehicle arranged in fixed relation to each other, journals for said wheels, a ball bearing journal box for each journal, a frame in which said journal boxes are mounted, and connections between said frame and each journal box consisting of a portion on said frame extending between spaced inner and outer projections on said journal box, clearance being left between said portion of the frame and the outer projection of each journal box so that said outer projections of the journal boxes are relieved from the lateral thrust of said frame.

3. In a railway car truck, the combination with wheels at opposite sides of the truck, a connecting axle on which said wheels are secured in fixed relation to each other, ball bearing journal boxes for journals at the opposite ends of said axle, a frame in which said journal boxes are mounted, and connections between said frame and each journal box consisting of coöperating contact portions on said frame and journal boxes, said portions being so arranged and related to each other that each journal box takes the lateral thrust of said frame in a direction toward the inner end of said journal box and is relieved of the lateral thrust of said frame in a direction toward the outer end of said journal box.

4. In a railway car truck, the combination with wheels at opposite sides of the truck, a connecting axle on which said wheels are secured in fixed relation to each other, ball bearing journal boxes for journals at the opposite ends of said axle, and a frame having pedestals in which said journal boxes are movable vertically, each pedestal having a part arranged outside of and adapted to engage an outwardly facing projection on the companion journal box, and said pedestals being free from contact with any inwardly facing part on the journal box so that each journal box is relieved from the lateral thrust of said frame in a direction toward the outer end of said journal box.

Witness my hand this 20th day of December, 1917.

JOHN H. BANINGER.

Witnesses:
LILLIAN NELSON,
ATTILIA M. KESTLER.